(12) United States Patent
Kokeguchi et al.

(10) Patent No.: US 7,184,198 B2
(45) Date of Patent: Feb. 27, 2007

(54) DISPLAY ELEMENT

(75) Inventors: Noriyuki Kokeguchi, Kokubunji (JP); Satoru Ikesu, Fuchu (JP)

(73) Assignee: Konica Minolta Holdings, Inc., Tokyo (JP)

( * ) Notice: Subject to any disclaimer, the term of this patent is extended or adjusted under 35 U.S.C. 154(b) by 37 days.

(21) Appl. No.: 11/075,159

(22) Filed: Mar. 8, 2005

(65) Prior Publication Data

US 2005/0206994 A1 Sep. 22, 2005

(30) Foreign Application Priority Data

Mar. 22, 2004 (JP) .............................. 2004-082225

(51) Int. Cl.
*G02B 26/00* (2006.01)
(52) U.S. Cl. .................................... 359/296
(58) Field of Classification Search ................ 359/296, 359/265, 266, 267, 268, 269, 270, 271, 272, 359/273, 274, 275
See application file for complete search history.

(56) References Cited

U.S. PATENT DOCUMENTS

| | | | |
|---|---|---|---|
| 3,995,943 A | | 12/1976 | Jasinski |
| 4,895,791 A | * | 1/1990 | Mukunoki .................. 430/523 |
| 5,764,401 A | * | 6/1998 | Udaka et al. ............... 359/270 |
| 6,552,843 B1 | | 4/2003 | Tench et al. |
| 6,630,507 B1 | * | 10/2003 | Hampson et al. ........... 514/454 |
| 6,721,080 B1 | | 4/2004 | Tench et al. |
| 2003/0072071 A1 | | 4/2003 | Asano et al. |

FOREIGN PATENT DOCUMENTS

| | | |
|---|---|---|
| EP | 0754781 | 1/1997 |
| EP | 0901034 | 3/1999 |

* cited by examiner

*Primary Examiner*—Hung Xuan Dang
*Assistant Examiner*—Tuyen Tra
(74) *Attorney, Agent, or Firm*—Lucas & Mercanti, LLP (57) ABSTRACT

A display element containing a pair of electrodes having therebetween an electrolyte layer containing silver or a silver-containing compound, the display element being driven by the pair of electrodes so as to electrochemically dissolve silver or to electrochemically deposit silver, wherein the electrolyte layer contains a compound represented by on of Formulae (1) to (7) described in the specification or a derivative thereof.

14 Claims, 1 Drawing Sheet

FIG. 1

DISPLAY ELEMENT

TECHNICAL FIELD

The present invention relates to an electrochemical display element utilizing dissolution and deposition of silver.

BACKGROUND OF THE INVENTION

In recent years, along with the increase in the operating speed of personal computers, the spread of network infrastructure, the markedly increased capacity of data storage, and the decrease in price, a further opportunity is increasing in which information such as text and images which have traditionally been supplied in the form of paper printed matter is now acquired and read as convenient electronic information.

Employed as such electronic information reading means are conventional liquid crystal displays as well as CRTs, and in recent years, emissive displays such as organic EL displays are drawn attention. Particularly, when electronic information is in the form of text, it is necessary for an operator to watch the browsing means for a relatively long period of time, which is not a human-conscious operation. Generally, it is known that emissive displays exhibit the following disadvantages: (i) screen flickering results in eye fatigue; (ii) display devices are not portable; (iii) reading posture is limited; (iv) operators tend to gaze at a still screen, and (v) reading over an extended period of time results in an increase of electric power consumption.

Known as display means to overcome such disadvantages are reflective displays (having a memory function) which do not consume power for maintaining images since these displays use external light. However, due to the following reasons, it is difficult to mention that sufficient performance is achieved.

Namely, displays employing polarized plates such as reflective liquid crystals exhibit reflectance as low as approximately 40 percent, resulting in having a problem in displaying white. Further, the production methods employed to prepare constituting members are not simple. Polymer dispersion type liquid crystal displays require relatively high voltage, in addition, since only the difference in the refractive index among organic materials is utilized, the resulting images do not exhibit sufficient contrast. Polymer network type liquid crystal displays result in problems in which a high voltage is required and in order to enhance memory functions, complicated TFE circuits are required. Display elements based on an electrophoretic method necessitate voltage as high as at least 10 V, and durability problems may occur due to coagulation of electrophoretic particles. Electrochromic display elements can be driven at as low as 3 V, however, color qualities of black and other colors (yellow, magenta, cyan, blue, green, and red) are not sufficient, and in addition, in order to keep the memory function of the display, complicated display constitution may be needed, for example, a constituting layer prepared by an evaporation technique.

Known as a display system which overcomes many of the above mentioned problems is an electrodeposition (hereinafter referred to as ED) display utilizing dissolution and deposition of metals or metal salts. The ED display exhibits advantages such that it is possible to drive the ED system at a voltage below 3 V, the cell structure is simple, the contrast between black-and white, as well as the quality of black are excellent. Various methods on ED displays have been disclosed (refer, for example, to Patent Documents 1–3).

However, in the conventional techniques, memory function of the display element (stability of the blackened image) has not been fully attained.

(Patent Document 1) U.S. Pat. No. 4,240,716
(Patent Document 2) Japanese Patent Publication No. 3428603
(Patent Document 3) Japanese Patent Publication Open to Public Inspection (hereinafter referred to as JP-A) No. 2003-241227

SUMMARY OF THE INVENTION

An object of the present invention is to provide a display element exhibiting a simple display construction, a low drive voltage, high display contrast, and an excellent memory function of the image.

An aspect of the present invention includes a display element containing a pair of electrodes having therebetween an electrolyte layer containing silver or a silver-containing compound, the display element being driven by the pair of electrodes so as to electrochemically dissolve silver or to electrochemically deposit silver, wherein the electrolyte layer contains a compound represented by one of the following Formulae (1) to (7) or a derivative thereof.

DESCRIPTION OF THE PREFERRED EMBODIMENTS

The above object of the present invention is achieved by the following structures.

(1) A display element containing a pair of electrodes having therebetween an electrolyte layer containing silver or a silver-containing compound, the display element being driven by the pair of electrodes so as to electrochemically dissolve silver or to electrochemically deposit silver, wherein the electrolyte layer contains a compound represented by one of Formulae (1) to (7) or a compound derived from the compound represented by one of Formulae (1) to (7):

Formula (1)

wherein:

$R_1$ through $R_3$ each represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, an hydroxy group, or a heterocyclic group.

Formula (2)

wherein:

M represents a hydrogen atom, a metal atom or a quarternary ammonium;

Z represents a group of atoms necessary to form a nitrogen-containing heterocyle combined with a carbon atom and a nitrogen atom, provided that Z is not an imidazole ring;

n represents an integer of 0 to 5;

$R_4$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, an hydroxy group, or a heterocyclic group; and when n is an integer of two or more, each $R_4$ may be the same or different, and each $R_4$ may be combined to form a condensed ring, Formula (3)

wherein:

Q represents a group of atoms necessary to form a 5- or 6-membered nitrogen-containing heterocyle combined with a nitrogen atom;

m represents an integer of 0 to 5;

$R_5$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, an hydroxy group, or a heterocyclic group; and when m is an integer of two or more, each $R_5$ may be the same or different, and each $R_5$ may be combined to form a condensed ring, $H_2R—R_6$  Formula (4)

wherein: $R_6$ represents an alkyl group, an aryl group or a heterocyclic group, $R_7—S—S—R_8$  Formula (5)

wherein:

$R_7$ and $R_8$ each represents an alkyl group, an aryl group or a heterocyclic group;

$R_7$ and $R_8$ may be the same or different; and $R_7$ and $R_8$ may be combined to form a ring,

$R_9—S—R_{10}$  Formula (6)

wherein:

$R_9$ and $R_{10}$ each represents an alkyl group, an aryl group or a heterocyclic group;

$R_9$ and $R_{10}$ may be the same or different; and $R_9$ and $R_{10}$ may be combined to form a condensed ring, Formula (7)

wherein:

$R_1$, and $R_{12}$ each represents an alkyl group or a hydrogen atom, provided that $R_{11}$ and $R_{12}$ are not simultaneously a hydrogen atom; and $R_{11}$ and $R_{12}$ may be combined to form a ring.

(2) A display element containing a pair of electrodes having therebetween an electrolyte layer containing silver or a silver-containing compound, the display element being driven by the pair of electrodes so as to electrochemically dissolve silver or to electrochemically deposit silver, wherein silver is dissolved in the electrolyte layer by dissolving a silver salt of a compound containing a mercapto group.

(3) The display element of Item 2, wherein the electrolyte layer satisfies Formula (8):

$2 \leq [—SH]/[Ag]S \leq 10$  Formula (8)

wherein:

[—SH] represents a total number of moles of sulfur atoms contained in the compound containing the mercapto group; and

[Ag] represents a total number of moles of silver atoms contained in the electrolyte layer.

(4) A display element containing a pair of electrodes having therebetween an electrolyte layer containing:

(i) silver or a silver-containing compound; and (ii) halogen ions or a halide compound, the display element being driven by the pair of electrodes so as to electrochemically dissolve silver or to electrochemically deposit silver, wherein the electrolyte layer satisfies Formula (9):

$0 < [X]/[Ag] \leq 0.8$  Formula (9)

wherein:

[X] represents a total number of moles of halogen atoms contained in the halogen ions or the halide compound in the electrolyte layer; and

[Ag] represents a total number of moles of silver atoms contained in the electrolyte layer.

(5) The display element of any one of Items (1) to (4), wherein the electrolyte layer further contains a solvent selected from the group consisting of:

propylene carbonate, ethylene carbonate, ethylmethyl carbonate, diethyl carbonate, dimethyl carbonate, butylene carbonate, γ-butyrolactone, tetramethylurea, sulfolane, dimethyl sulfoxide, 1,3-dimethyl-2-imidazolidinone, 2-(N-methyl)-2-pyrrolidinone, hexamethylphosphortriamide, N-methylpropione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxyethane, diethoxyfuran, tetrahydrofuran, ethylene glycol, diethylene glycol, triethylene glycol monobutyl ether, and water.

(6) The display element of any one of Items (1) to (5), wherein the electrolyte layer further contains white particles.

(7) The display element of any one of Items (1) to (6), wherein the electrolyte layer further contains a thickener selected from the group consisting of polyvinyl alcohol, hydroxypropyl cellulose, polyalkylene glycol and polyvinyl pirrolidone.

(8) The display element of any one of Items (1) to (7), wherein one of the pair of electrodes is a metal electrode.

(9) The display element of any one of Items (1) to (8), wherein one of the pair of electrodes is a transparent electrode.

(10) The display element of any one of Items (1) to (9), wherein a display element operation is simple matrix drive.

The display element of the present invention will now be detailed.

It was found that a display element exhibiting:
(i) a simple display construction;
(ii) a low drive voltage;
(iii) high display contrast; and
(iv) excellent memory function,
is achieved by the construction of the following display element:

A display element containing a pair of electrodes having therebetween an electrolyte layer containing silver or a silver-containing compound, the display element being driven by the pair of electrodes so as to electrochemically dissolve silver or to electrochemically deposit silver,
wherein:

1) the electrolyte layer contains a compound represented by one of the above Formulae (1) to (7) or a derivative thereof;

2) the electrolyte layer contains a compound having a mercapto group, and, when [—SH] represents a total number of moles of sulfur contained in the compound containing the mercapto group, and [Ag] represents a total number of moles of silver contained in the electrolyte layer, the above Formula (8) is satisfied;

3) when [X] represents a total number of moles of halogen (Cl, Br, I and F) contained in the electrolyte-layer, and [Ag] represents a total number of moles of silver contained in the electrolyte layer, the above Formula (9) is satisfied;

4) the silver-dissolving solution to be used in the electrolyte is prepared by dissolving a silver salt of a mercapto compound in a solvent.

[Silver or Compounds Containing Silver in the Molecule]

The term "silver or compounds containing silver in the molecule", according to the present invention, is a general term referring to compounds such as silver oxide, silver sulfide, metallic silver, colloidal silver particles, silver halide, silver complex compounds, or silver ions, and phase states such as a solid state, a dissolved state in a liquid, or a gaseous state, as well as charge states such as a neutral state, an anionic state, or a cationic state are not particularly specified.

[Basic Structure of the Display Element]

Figure 1:
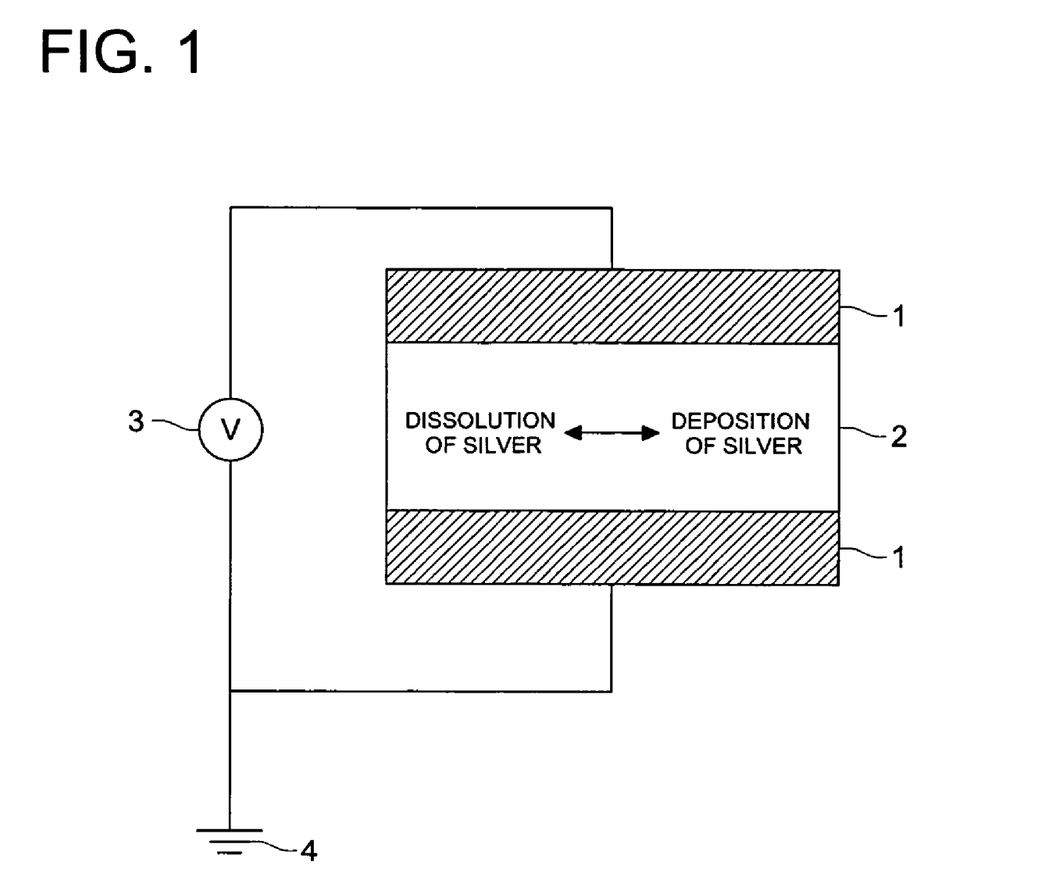
FIG. 1 is a schematic cross-section view illustrating the basic structure of the display element of the present invention.

FIG. 1 is a schematic cross-sectional view showing the basic structure of the display element of the present invention.

As shown in FIG. 1, the display element of the present invention incorporates electrolyte layer 2 between paired electrodes 1. In the display element, the display state is varied utilizing differences in optical properties of the silver-containing compound such as transmission and absorption of light. The optical properties of silver-containing compound is changed by dissolving silver in electrolyte layer 2 or depositing silver from electrolyte layer 2 by applying voltage or current through the paired electrodes 1 from power source 3.

[Compounds Represented by Formulae (1) to (7)]

One of the characteristic features of the present invention is that the electrolyte of the display element contains one of the compounds represented by Formulae (1) to (7) or derivatives thereof.

(Compounds Represented by Formula (1))

In Formula (1), $R_1$ through $R_3$ each represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, an hydroxy group, or a heterocyclic group.

Specific examples of atoms and groups represented by each of $R_1$ through $R_3$ in Formula (1) are as follows:

examples of a halogen atom include a fluorine atom, a chlorine atom, a bromine atom and an iodine atom;

examples of an alkyl group include a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group;

examples of an aryl group include a phenyl group, and a naphthyl group;

examples of an alkylcarbonamide group include an acetylamino group, a propionylamino and a butyroylamino group;

examples of an arylcarbonamide group include an benzoylamino group;

examples of an alkylsulfonamide group include a methanesulfonylamino group and an ethanesulfonylamino group;

examples of an arylsulfonamide group include a benzenesulfonylamino group and a toluenesulfonylamino group;

examples of an arylsulfonamide group include a benzenesulfonylamino group and a toluenesulfonylamino group;

examples of an aryloxy group include a phenoxy group;

examples of an alkylthio group include a methylthio group, an ethylthio group and a butylthio group;

examples of an aryltion group include a phenylthio group and a tolylthio group;

examples of an alkylcarbamoyl group include a methylcarbamoyl group, a dimethylcarbamoyl group, an ethylcarbamoyl group, a diethylcarbamoyl group, a dibutylcarbamoyl group, a piperidylcarbamoyl group, and a morpholylcarbamoyl group;

examples of an arylcarbamoyl group include a phenylcarbamoyl group, a methylphenylcarbamoyl group, an ethylphenylcarbamoyl group and a benzylphenylcarbamoyl group;

examples of an alkylsulfamoyl group include a methylsulfamoyl group, a dimethylsulfamoyl group, an ethylsulfamoyl group, a diethylsulfamoyl group, a dibutylsulfamoyl group, a piperidylsulfamoyl group, and a morpholylsulfamoyl group;

examples of an arylsulfamoyl group include a phenylsulfamoyl group, a methylphenylsulfamoyl group, an ethylphenylsulfamoyl group, and a benzylphenylsulfamoylgroup;

examples of an alkylsulfonyl group include a methanesulfonyl group and an ethanesulfonyl group;

examples of an arylsulfonyl group include a phenylsulfonyl group, a 4-chlorophenylsulfonyl group and a p-toluenesulfonyl group;

examples of an alkoxycarbonyl group include a methoxycarbonyl group, an ethoxycarbonyl group and a butoxycarbonyl group;

examples of an aryloxycarbonyl group include a phenoxy carbonyl group;

examples of an alkylcarbonyl group include an acetyl group, a propionyl group and a butyroyl group;

examples of an arylcarbonyl group include a benzoyl group and an alkylbenzoyl group;

examples of an acyloxy group include an acetyloxy group, a propionyloxy group and a butyroyloxy group;

examples of an heterocyclic group include an oxazole ring, an imidazole ring, a thiazole ring, a triazole ring, a selenazole ring, a tetrasol ring, an oxadiazole ring, a thiadiazole ring, a thiazin ring, a triazine ring, a benzoxazole ring, a benzthiazole ring, a benzimidazole ring, the indolenine ring, a benzselenazole ring, the naphthothiazole ring, a triazaindolizine ring, a diazaindolizine ring and a tetraazaindolizine ring. These substituents may further have a substituent.

Specific examples of a compound represented by Formula (1) will be shown below, however, the present invention is not limited thereto.

1-1

1-2

1-3

1-4

1-5

1-6

1-7

1-8

1-9

(Compounds Represented by Formula (2))

Compounds represented by Formula (2) will be described.

In Formula (2), M represents a hydrogen atom, a metal atom or a quarternary ammonium; Z represents a group of atoms necessary to form a nitrogen-containing heterocyle combined with a carbon atom and a nitrogen atom, provided that Z is not an imidazole ring; n represents an integer of 0 to 5; $R_4$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, an hydroxy group, or a heterocyclic group; and when n is an integer of two or more, each $R_4$ may be the same or different, and each $R_4$ may be combined to form a condensed ring.

Examples of a metal atom represented by M include Li, Na, K, Mg, Ca, Zn and Ag. Examples of a quarternary ammonium include $NH_4$, $N(CH_3)_4$, $N(C_4H_9)_4$, $N(CH_3)_3C_{12}H_{25}$, $N(CH_3)_3C_{16}H_{33}$, and $N(CH_3)_3CH_2C_6H_5$.

Examples of a nitrogen-containing heterocyclic ring represented by Z in Formula (2) include a tetrazole ring, a triazole ring, an oxydiazole ring, a thiadiazole ring, an indole ring, an oxazole ring, a benzoxazole ring, a benzothiazole ring, a benzoselenazole ring and a naphthoxazole ring.

In Formula (2), $R_4$ represents one of the atoms or groups listed below:

examples of a halogen atom include a fluorine atom, a chlorine atom, a bromine atom and an iodine atom;

examples of an alkyl group include a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group;

examples of an aryl group include a phenyl group, and a naphthyl group;

examples of an alkylcarbonamide group include an acetylamino group, a propionylamino and a butyroylamino group;

examples of an arylcarbonamide group include an benzoylamino group;

examples of an alkylsulfonamide group include a methanesulfonylamino group and an ethanesulfonylamino group;

examples of an arylsulfonamide group include a benzenesulfonylamino group and a toluenesulfonylamino group;

examples of an arylsulfonamide group include a benzenesulfonylamino group and a toluenesulfonylamino group;

examples of an aryloxy group include a phenoxy group;

examples of an alkylthio group include a methylthio group, an ethylthio group and a butylthio group;

examples of an aryltion group include a phenylthio group and a tolylthio group;

examples of an alkylcarbamoyl group include a methylcarbamoyl group, a dimethylcarbamoyl group, an ethylcarbamoyl group, a diethylcarbamoyl group, a dibutylcarbamoyl group, a piperidylcarbamoyl group, and a morpholylcarbamoyl group;

examples of an arylcarbamoyl group include a phenylcarbamoyl group, a methylphenylcarbamoyl group, an ethylphenylcarbamoyl group and a benzylphenylcarbamoyl group;

examples of an alkylsulfamoyl group include a methylsulfamoyl group, a dimethylsulfamoyl group, an ethylsulfamoyl group, a diethylsulfamoyl group, a dibutylsulfamoyl group, a piperidylsulfamoyl group, and a morpholylsulfamoyl group;

examples of an arylsulfamoyl group include a phenylsulfamoyl group, a methylphenylsulfamoyl group, an ethylphenylsulfamoyl group, and a benzylphenylsulfamoylgroup;

examples of an alkylsulfonyl group include a methanesulfonyl group and an ethanesulfonyl group;

examples of an arylsulfonyl group include a phenylsulfonyl group, a 4-chlorophenylsulfonyl group and a p-toluenesulfonyl group;

examples of an alkoxycarbonyl group include a methoxycarbonyl group, an ethoxycarbonyl group and a butoxycarbonyl group;

examples of an aryloxycarbonyl group include a phenoxy carbonyl group;

examples of an alkylcarbonyl group include an acetyl group, a propionyl group and a butyroyl group;

examples of an arylcarbonyl group include a benzoyl group and an alkylbenzoyl group;

examples of an acyloxy group include an acetyloxy group, a propionyloxy group and a butyroyloxy group;

examples of an heterocyclic group include an oxazole ring, a thiazole ring, a triazole ring, a selenazole ring, a tetrasol ring, an oxadiazole ring, a thiadiazole ring, a thiazin ring, a triazine ring, a benzoxazole ring, a benzthiazole ring, a benzimidazole ring, the indolenine ring, a benzselenazole ring, the naphthothiazole ring, a triazaindolizine ring, a diazaindolizine ring and a tetraazaindolizine ring. These substituents may further have a substituent.

Specific examples of a compound represented by Formula (2) will be shown below, however, the present invention is not limited thereto.

2-1

2-2

2-3

2-4

2-5

2-6

2-7

2-8

2-9

2-10

2-11

2-12

2-13

(Compounds Represented by Formula (3))

Compounds represented by Formula (3) will be described.

In Formula (3):

Q represents a group of atoms necessary to form a 5- or 6-membered nitrogen-containing heterocycle combined with a nitrogen atom;

m represents an integer of 0 to 5;

$R_5$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, an hydroxy group, or a heterocyclic group; and when m is an integer of two or more, each $R_5$ may be the same or different, and $R_5$ may be combined to form a condensed ring.

Examples of a nitrogen-containing heterocyclic ring include a tetrasol ring, a triazole ring, an imidazole ring, a benzotriazole ring, a benzimidazole ring and a naphthotriazole ring.

Specific examples of atoms and groups represented by $R_5$ in Formula (3) are as follows:

examples of a halogen atom include a fluorine atom, a chlorine atom, a bromine atom and an iodine atom;

examples of an alkyl group include a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group;

examples of an aryl group include a phenyl group, and a naphthyl group;

examples of an alkylcarbonamide group include an acetylamino group, a propionylamino and a butyroylamino group;

examples of an arylcarbonamide group include an benzoylamino group;

examples of an alkylsulfonamide group include a methanesulfonylamino group and an ethanesulfonylamino group;

examples of an arylsulfonamide group include a benzenesulfonylamino group and a toluenesulfonylamino group;

examples of an arylsulfonamide group include a benzenesulfonylamino group and a toluenesulfonylamino group;

examples of an aryloxy group include a phenoxy group;

examples of an alkylthio group include a methylthio group, an ethylthio group and a butylthio group;

examples of an aryltion group include a phenylthio group and a tolylthio group;

examples of an alkylcarbamoyl group include a methylcarbamoyl group, a dimethylcarbamoyl group, an ethylcarbamoyl group, a diethylcarbamoyl group, a dibutylcarbamoyl group, a piperidylcarbamoyl group, and a morpholylcarbamoyl group;

examples of an arylcarbamoyl group include a phenylcarbamoyl group, a methylphenylcarbamoyl group, an ethylphenylcarbamoyl group and a benzylphenylcarbamoyl group;

examples of an alkylsulfamoyl group include a methylsulfamoyl group, a dimethylsulfamoyl group, an ethylsulfamoyl group, a diethylsulfamoyl group, a dibutylsulfamoyl group, a piperidylsulfamoyl group, and a morpholylsulfamoyl group;

examples of an arylsulfamoyl group include a phenylsulfamoyl group, a methylphenylsulfamoyl group, an ethylphenylsulfamoyl group, and a benzylphenylsulfamoylgroup;

examples of an alkylsulfonyl group include a methanesulfonyl group and an ethanesulfonyl group;

examples of an arylsulfonyl group include a phenylsulfonyl group, a 4-chlorophenylsulfonyl group and a p-toluenesulfonyl group;

examples of an alkoxycarbonyl group include a methoxycarbonyl group, an ethoxycarbonyl group and a butoxycarbonyl group;

examples of an aryloxycarbonyl group include a phenoxy carbonyl group;

examples of an alkylcarbonyl group include an acetyl group, a propionyl group and a butyroyl group;

examples of an arylcarbonyl group include a benzoyl group and an alkylbenzoyl group;

examples of an acyloxy group include an acetyloxy group, a propionyloxy group and a butyroyloxy group;

examples of an heterocyclic group include an oxazole ring, an imidazole ring, a thiazole ring, a triazole ring, a selenazole ring, a tetrasol ring, an oxadiazole ring, a thiadiazole ring, a thiazin ring, a triazine ring, a benzoxazole ring, a benzthiazole ring, a benzimidazole ring, the indolenine ring, a benzselenazole ring, the naphthothiazole ring, a triazaindolizine ring, a diazaindolizine ring and a tetraazaindolizine ring. These substituents may further have a substituent.

Specific examples of a compound represented by Formula (3) will be shown below, however, the present invention is not limited thereto.

3-24

3-25

3-26

3-27

3-28

3-29

(Compounds Represented by Formula (4))

Compounds represented by Formula (4) will be described.

In Formula (4), $R_6$ represents an alkyl group, an aryl group or a heterocyclic group.

Specific examples of groups represented by $R_6$ in Formula (4) are as follows:

examples of an alkyl group include a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group;

examples of an aryl group include a phenyl group, and a naphthyl group;

examples of an heterocyclic group include an oxazole ring, an imidazole ring, a thiazole ring, a triazole ring, a selenazole ring, a tetrasol ring, an oxadiazole ring, a thiadiazole ring, a thiazin ring, a triazine ring, a benzoxazole ring, a benzthiazole ring, a benzimidazole ring, the indolenine ring, a benzselenazole ring, the naphthothiazole ring, a triazaindolizine ring, a diazaindolizine ring and a tetraazaindolizine ring. These substituents may further have a substituent.

Specific examples of a compound represented by Formula (4) will be shown below, however, the present invention is not limited thereto.

4-1

H₂N—SO₃H 4-2

H₂N—COOH 4-3

OH, NH₂ (4-aminophenol)

4-4

H₂N—OH (Compounds Represented by Formula (5))

Compounds represented by Formula (5) will be described.

In Formula (5), $R_7$ and $R_8$ each represents an alkyl group, an aryl group or a heterocyclic group. $R_7$ and $R_8$ may be the same or different and may be combined to form a ring.

Specific examples of groups represented by each of $R_7$ and $R_8$ in Formula (5) are as follows:

examples of an alkyl group include a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group;

examples of an aryl group include a phenyl group, and a naphthyl group;

examples of an heterocyclic group include an oxazole ring, an imidazole ring, a thiazole ring, a triazole ring, a selenazole ring, a tetrasol ring, an oxadiazole ring, a thiadiazole ring, a thiazin ring, a triazine ring, a benzoxazole ring, a benzthiazole ring, a benzimidazole ring, the indolenine ring, a benzselenazole ring, the naphthothiazole ring, a triazaindolizine ring, a diazaindolizine ring and tetraazaindolizine ring. These substituents may further have a substituent.

Specific examples of a compound represented by Formula (5) will be shown below, however, the present invention is not limited thereto.

5-1

5-2

-continued (Compounds Represented by Formula (6))

Compounds represented by Formula (6) will be described.

In Formula (6), $R_9$ and $R_{10}$ each represents an alkyl group, an aryl group or a heterocyclic group. $R_9$ and $R_{10}$ may be the same or different and may be combined to form a ring.

Specific examples of groups represented by each of $R_7$ and $R_8$ in Formula (6) are as follows:

examples of an alkyl group include a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group;

examples of an aryl group include a phenyl group, and a naphthyl group;

examples of an heterocyclic group include an oxazole ring, an imidazole ring, a thiazole ring, a triazole ring, a selenazole ring, a tetrasol ring, an oxadiazole ring, a thiadiazole ring, a thiazin ring, a triazine ring, a benzoxazole ring, a benzthiazole ring, a benzimidazole ring, the indolenine ring, a benzselenazole ring, the naphthothiazole ring, a triazaindolizine ring, a diazaindolizine ring and a tetraazaindolizine ring. These substituents may further have a substituent.

Specific examples of a compound represented by Formula (6) will be shown below, however, the present invention is not limited thereto.

One of the characteristic features of the present invention is that a hydroxylamine compound represented by Formula (7) is used in the electrolyte layer.

In Formula (7), $R_{11}$ and $R_{12}$ each represents a hydrogen atom or an alkyl group, provided that $R_{11}$ and $R_{12}$ are not simultaneously a hydrogen atom. $R_{11}$ and $R_{12}$ may be combined to form a ring.

Alkyl groups represented by $R_{11}$ and $R_{12}$ may be the same or different. Each alkyl group preferably has a carbon number of 1 to 3. $R_{11}$ and $R_{12}$ may further have a substituent. $R_{11}$ and $R_{12}$ may be combined to form a ring which may be a heterocyclic ring, for example, piperidine or morpholine.

As the above mentioned substituent, a sulfonic acid group or an alkoxy group is specifically preferable.

Specific examples of the hydroxylamine compounds have been disclosed in, for example, U.S. Pat. Nos. 3,287,125, 3,293,034 and 3,287,124 and also will be will be shown below.

$$\begin{array}{c} R_{11} \\ \diagdown \\ N-OH \\ \diagup \\ R_{12} \end{array}$$

| Exemplified Compound No. | $R_{11}$ | $R_{12}$ |
|---|---|---|
| 7-1 | —$C_2H_5$ | —$C_2H_5$ |
| 7-2 | —$CH_3$ | —$CH_3$ |
| 7-3 | —$C_3H_7$(n) | —$C_3H_7$(n) |
| 7-4 | —$C_3H_7$(i) | —$C_3H_7$(i) |
| 7-5 | —$CH_3$ | —$C_2H_5$ |
| 7-6 | —$C_2H_5$ | —$C_3H_7$(i) |
| 7-7 | —$CH_3$ | —$C_3H_7$(n) |
| 7-8 | —H | —$C_2H_5$ |
| 7-9 | —H | —$C_3H_7$(n) |
| 7-10 | —H | —$CH_3$ |
| 7-11 | —H | —$C_3H_7$(i) |
| 7-12 | —$C_2H_5$ | —$C_2H_4OCH_3$ |

-continued $$\begin{array}{c} R_{11} \\ | \\ N-OH \\ | \\ R_{12} \end{array}$$

| Exemplified Compound No. | $R_{11}$ | $R_{12}$ |
|---|---|---|
| 7-13 | —$C_2H_4OH$ | —$C_2H_4OH$ |
| 7-14 | —$C_2H_4SO_3H$ | —$C_2H_5$ |
| 7-15 | —$C_2H_4COOH$ | —$C_2H_4COOH$ |
| 7-16 | HN(piperazine)N—OH | |
| 7-17 | $HOCH_2CH_2$—N(piperazine)N—OH | |
| 7-18 | O(morpholine)N—OH | |
| 7-19 | $CH_3$—N(piperazine)N—OH | |
| 7-20 | —$CH_3$ | —$C_2H_4OCH_3$ |
| 7-21 | —$C_2H_4OCH_3$ | —$C_2H_4OCH_3$ |
| 7-22 | —$C_2H_4OC_2H_5$ | —$C_2H_4OC_2H_5$ |
| 7-23 | —$C_3H_6OCH_3$ | —$C_3H_6OCH_3$ |
| 7-24 | —$C_2H_5$ | —$C_2H_4OC_2H_5$ |
| 7-25 | —$C_3H_7$ | —$C_2H_4OCH_3$ |
| 7-26 | —$CH_3$ | —$C_2H_4OC_2H_5$ |
| 7-27 | —$CH_3$ | —$CH_2OCH_3$ |
| 7-28 | —$C_2H_5$ | —$CH_2OC_2H_5$ |
| 7-29 | —$CH_2OCH_3$ | —$CH_2OCH_3$ |
| 7-30 | —$C_2H_5$ | —$C_2H_4OC_3H_7$ |
| 7-31 | —$C_3H_6OC_3H_7$ | —$C_3H_6OC_3H_7$ |
| 7-32 | —$CH_2CH_2SO_3H$ | —$CH_2CH_2SO_3H$ |
| 7-33 | —$CH_2CH_2PO_3H_2$ | —$CH_2CH_2PO_3H_2$ |
| 7-34 | HO—N(piperazine)N—OH | |
| 7-35 | H\N—N—OH with SO_3Na branch | |

The compound represented by Formula (7) of the present invention is usually used as, for example, a free amine, a hydrochloride, a sulfate, a p-toluenesulfonic acid salt, an oxalate, a phosphate or an acetate.

Among the compounds represented by Formulae (1) to (7) of the present invention, preferable compounds include those represented by 1-2, 1-4, 1-11, 2-11, 2-12, 3-6, 3-12, 3-23, 4-4, 5-1, 6-1 and 7-14, and more preferable compounds include the compounds having a mercapto group.

In order to give rise to dissolution or deposition of silver, it is important to solubilize silver in the electrolyte. Silver or a silver-containing compound is usually solubilized by coexisting silver or a silver-containing compound with a compound having interaction with them, herein the interaction being, for example, a coordinate bond or a weak covalent bond. Examples of the compounds having the above described interaction with silver or a silver-containing compound include a halogen atom, a mercapto group, a carboxyl group and an imino group. Of these, a mercapto group is preferable, because the mercapto group has a smaller influence to the coexisting compound and a higher solubitity to the solvent. Compounds represented by formulae 1-2, 1-4, 1-11 and reaction products thereof are specifically preferable.

One of the characteristic features of the display element of the present invention is that the following Formula (8) is satisfied:

$$2 \leq [-SH]/[Ag] \leq 10 \qquad \text{Formula (8)}$$

wherein:

[—SH] represents a total number of moles of sulfur contained in the compound containing the mercapto group; and

[Ag] represents a total number of moles of silver contained in the electrolyte layer.

When [—SH]/[Ag] in Formula (8) is less than 2, silver is not sufficiently blocked, and, under high temperature and high humidity, or when basic compounds coexist, blackening of silver proceeds, whereby the reflection ratio of white is reduced and whiteness is degraded. On the other hand, when [—SH]/[Ag] in Formula (8) exceeds 10, the dissolution rate of blackened silver due to mercapto compounds increases, whereby memory function of the display element (stability of the blackened image) is degraded. The more preferred range is $2.5 \leq [-SH]/[Ag] \leq 5$ in the display element of the present invention.

Further, preferred as mercapto compounds are those which satisfy the condition of $50 \leq$ [molecular weight of a mercapto compound] $\leq 149$.

When the molecular weight of mercapto compounds is less than 50, workability suffers due to unpleasant odor. Alternatively, when it exceeds 150, the number of moles of the mercapto compound becomes smaller when the same weight of the compound is used, resulting in a decrease in solubility of the compounds necessary to retain electrical conductivity, whereby the driving rate is decreased. When the number of moles of the mercapto compound decreases, the solubility of the compound necessary to retain electrical conductivity of the electrolyte also decreases, because the solubility depends on the number of the mercapto group existing in the electrolyte.

Further, it is preferable that a plurality of types of mercapto compounds is employed in combination. By incorporating a plularity of types of compounds, it is possible to enhance the solubility of silver and to minimize deposition of silver at low temperature of the electrolyte solution.

One of the characteristic features of the display element of the present invention is that the following Formula (9) is satisfied:

$$0 \leq [X]/[Ag]g \leq 0.8 \qquad \text{Formula (9)}$$

wherein:

[X] represents a total number of moles of halogen contained in the electrolyte layer; and

[Ag] represents a total number of moles of silver contained in the electrolyte layer.

The term "halogen" used in the present invention represents one of iodine, chlorine, bromine and fluorine.

When the [X]/[Ag] value in Formula (9) is more than 0.8, the reaction of $X^- \rightarrow X_2$ tends to occur while silver is oxidized. $X_2$ easily dissolves blackened silver by oxidizing the blackened silver, which is one of the factors degrading memory function of the display.

Halogen easily degrades memory function of the display element, however, when no halogen is contained in the electrolyte, the electrical conductivity of the electrolyte decreases, resulting in decrease of the driving rate of the display element. Accordingly, halogen is preferably added within the range it may not degrade the memory function of the display element. The [X]/[Ag] value is preferably $0.01 \leq$ [X]/[Ag]$\leq 0.4$. In order to retain a good memory function, the relationship among the concentrations of halogen species is preferably [I]<[Br]<[Cl]<[F].

Silver ion concentration (Ag) in the electrolyte layer is preferably 0.2 mol/L$\leq$(Ag)$\leq$2.0 mol/L. When the silver ion concentration is less than 0.2 mol/L, the silver ion concentration is too low, resulting in a decrease in the driving rate. Further, when the silver ion concentration exceeds 3 mol/L, solubility is degraded whereby undesired deposition tends to occur during storage at low temperature.

One of the features of the display element of the present invention is that a silver-dissolving solution is prepared by dissolving a silver salt of a mercapto compound in a solvent.

When silver salts are dissolved in a solvent, commonly employed as silver salts are silver halides such as silver iodide, silver chloride, or silver bromide, as well as organic silver salts such as silver citrate, silver oxalate, or silver behenate. However, in order to maximize the solubility of silver in electrolytes, it is advantageous that a silver salt of a mercapto compound is previously prepared, followed by dissolving it to the electrolyte. Further, when high temperature treatment at approximately 120° C. is employed during the production process, it is preferable to previously block silver employing a mercapto group to reduce discoloration due the silver-blackening. It is also preferable in view of the ease of process operation, and enhancement of stability of electrolytes.

Listed as preferable mercapto silver salts are, for example, silver salts of mercaptobenzimidazoles, silver salts of mercaptoimidazoles, silver salts of mercaptobenzotriazoles, mercaptotriazoles, and silver salts of mercaptothiadiazoles. It is also preferable that electrolytes are prepared in such a manner that silver salts of mercapto compounds and the same type of the mercapto compounds are simultaneously added. By simultaneously adding the same types of mercapto compounds, so-called solvent shock (which may occur when different solvents are mixed together) during addition of silver salts of the mercapto compounds is reduced due to coexisting compounds, whereby it is possible to shorten the liquid standing time which is required to allow uniform arrangement of chemical species in the electrolyte solution.

(Electrolyte Solvents)

In the display element of the present invention, the electrolyte layer preferably contains one solvent selected from the group consisting of: propylene carbonate, ethylene carbonate, ethylmethyl carbonate, diethyl carbonate, dimethyl carbonate, butylene carbonate, γ-butyrolactone, tetramethylurea, sulfolane, dimethyl sulfoxide, 1,3-dimethyl-2-imidazolidinone, 2-(N-methyl)-2-pyrrolidinone, hexamethylphosphortriamide, N-methylpropioneamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxy ethane, diethoxyfuran, tetrahydrofuran, ethylene glycol, diethylene glycol, triethylene glycol monobutyl ether, and water.

It is preferable that at least one solvent having the freezing point of not more than −20° C., and the boiling point of not less than 120° C. is contained, examples of which include: propylene carbonate, ethylene carbonate, ethylmethyl carbonate, diethyl carbonate, γ-butyrolactone, 2-(N-methyl)-2-pyrrolidinone, N-methylpropione amide, N,N-dimethylformamide, and acetylacetone.

Other solvents usable in the present invention may be those shown in, for example, J. A. Riddick, W. B. Bunger, T. K. Sakano, "Organic Solvents", 4th ed., John Wiley & Sons (1986), Y. Marcus, "Ion Solvation", John Wiley & Sons (1985), C. Reichardt, "Solvents and Solvent Effects in Chemistry", 2nd ed., VCH (1988), G. J. Janz, R. P. T. Tomkins, "Nonaqueous Electrolytes Handbook", Vol. 1, Academic Press (1972)

(Electrolyte Materials)

In the display element of the present invention, when electrolytes are in liquid form, it is possible to incorporate, in the electrolytes, the following compounds. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonim borofluoride, tetrabutylammonium borofluoride, and tetrabutylammonium halide. In addition, preferably used are fused salt electrolyte compositions described in paragraphs [0062]–[0081] of JP-A No. 2003-187881. Further employed are compounds which form oxidation-reduction pairs such as $I^-/I_3^-$, $Br^-/Br_3^-$ and quinone/hydroquinone.

Further, when electrolytes are in solid form, it is possible to incorporate, in the electrolytes, the following compounds which exhibit electronic or ionic conductivity.

Listed are fluorinated vinyl based polymers containing perfluorosulfonic acid; polythiophene; polyaniline; polypyrrole, triphenylamines; polyvinylcarbazoles; polymethylphenylsilanes; calcogenides such as $Cu_2S$, $Ag_2S$, $Cu_2Se$, or $AgCrSe_2$; fluorine compounds such as $CaF_2$, $PbF_2$, $SrF_2$, $LaF_3$, $TlSn_2F_5$, or $CeF_3$; lithium salts such as $Li_2SO_4$ or $Li_4SiO_4$; as well as compounds such as $ZrO_2$, CaO, $Cd_2O_3$, $HfO_2$, $Y_2O_3$, $Nb_2O_5$; $WO_3$, $Bi_2O_3$, AgBr, AgI, CuCl, CuBr, CuBr, CuI, LiI, LiBr, LiCl, $LiAlCl_4$, $LiAlF_4$, AgSBr, $C_5H_5NHAg_5I_6$, $Rb_4Cu_{16}I_7Cl_{13}$, $Rb_3Cu_7Cl_{10}$, LiN, $Li_5NI_2$, or $Li_6NBr_3$.

Further employed as supporting electrolytes may be electrolytes in gel form. When electrolytes are nonaqueous, it is possible to employ oil gelling agents described in paragraphs [0057]–[0059] of JP-A No. 11-185836.

(White Particles Added to the Electrolyte Layer)

In the display element of the present invention, it is preferable that the electrolyte layer incorporates white particles.

Examples of white particles include: titanium dioxide (an anatase type or a rutile type), barium sulfate, calcium carbonate, aluminum oxide, zinc oxide, magnesium oxide, zinc hydroxide, magnesium hydroxide, magnesium phosphate, magnesium hydrogenphosphate, alkaline earth metal salts, talc, kaolin, zeolite, acid clay, glass, as well as organic compounds such as polyethylene, polystyrene, acryl resins, ionomers, ethylene-vinyl acetate copolymer resins, benzoguanamine resins, urea-formalin resins, melamine-formalin resins, or polyamide resins. These particle may be used alone or in combination. Also, the particles may contain voids to alter the refractive index.

Of these, preferably employed are titanium dioxide, zinc oxide, and zinc hydroxide. More preferably employed are titanium dioxide which has been subjected to a surface treatment employing inorganic oxides (for example, $Al_2O_3$, AlO(OH), and $SiO_2$). In addition to such surface treatments, titanium dioxide particles may be subjected to a treatment employing organic compounds such as trimethylolethane or triethanolamine acetic acid salts.

Of these white particle materials, titanium oxide or zinc oxide are preferably used in order to prevent coloring at a higher temperature or to increase reflectance of the display element which is influenced by the refractive index.

(Thickening Agents Added to the Electrolyte Layer)

In the display element of the present invention, it is possible to use thickening agents in the electrolyte layer. Examples include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly (methacrylic acid), copoly(styrene-maleic anhydride), copoly(styrene-acrylonitrile), copoly(styrene-butadiene), poly(vinyl acetals) (for example, poly(vinyl formal), poly (vinyl butyral)), poly(vinyl esters), poly(urethanes), phenoxy resins, poly(vinylidene chloride), poly(epoxides), poly (carbonates), poly(vinyl acetate), cellulose esters, poly (amides), as well as polyvinyl butyral, cellulose acetate, cellulose acetate butyrate, polyester, polycarbonate, polyacrylic acid, and polyurethane as a transparent hydrophobic binder.

These thickening agents may be employed in combinations of at least two types. Further listed are the compounds described on pages 71–75 of JP-A No. 64-13546. Of these, in view of compatibility with various types of additives and enhancement of dispersion stability of white particles, preferably employed compounds are polyvinyl alcohols, polyvinylpyrrolidones, hydroxypropyl celluloses, and polyalkylene glycols.

(Other Additives to the Electrolyte Layer)

In the present invention, listed as layers which are provided between the pair of electrodes containing the electrolyte layer include ancillary layers such as a protective layer, a filter layer, an antihalation layer, a cross-over light cutting layer, or a backing layer. If required, incorporated in these ancillary layers may be various chemical sensitizers, noble metal sensitizers, photosensitive dyes, supersensitizers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, UV absorbers, antirradiation dyes, filter light absorbing dyes, mildewcides, polymer latexes, heavy metals, antistatic agents, and matting agents.

The additives listed above are more detailed in Research Disclosure (hereinafter referred to as RD) Volume 176 Item/17643 (December 1978), RD Volume 184 Item/18431 (August 1979), DR Volume 187 Item/18716 (November 1979), and RD Volume 308 Item/308119 (December 1989).

Types of compounds and their citations in RD are listed below.

| Additives | RD 17643 Page | Section | RD 18716 Page | Section | RD 308119 Page | Section |
|---|---|---|---|---|---|---|
| Chemical Sensitizers | 23 | III | 648 | right top | 96 | III |
| Sensitizing Dyes | 23 | IV | 648–649 | | 996–8 | IV |
| Desensitizing Dyes | 23 | IV | | | 998 | IV |
| Dyes | 25–26 | VIII | 649–650 | | 1003 | VIII |
| Development Accelerators | 29 | XXI | 648 | right top | | |
| Antifoggant Stabilizer | 24 | IV | 649 | right top | 1006–7 | VI |
| Optical Brightening Agents | 24 | V | | | 998 | V |
| Hardeners | 26 | X | 651 | left | 1004–5 | X |
| Surfactants | 26–7 | XI | 650 | right | 1005–6 | XI |
| Antistatic Agents | 27 | XII | 650 | right | 1006–7 | XIII |
| Plasticizers | 27 | XII | 650 | right | 1006 | XII |
| Lubricants | 27 | XII | | | | |
| Matting Agents | 28 | XVI | 650 | right | 1008–9 | XVI |
| Binders | 26 | XXII | | | 1003–4 | IX |
| Supports | 28 | XVII | | | 1009 | XVII |

(Layer Configuration)

The layer configuration between the counter electrodes related to the display element of the present invention will now be described in more detail.

As the layer configuration related to the display element of the present invention, it is possible to arrange a constituting layer containing positive hole transport materials. Examples of positive hole transport materials include aromatic amines, triphenylene derivatives, oligochiophene compounds, polypyrroles, polyacetylene derivatives, polyphenylene vinylene derivatives, polythienylene vinylene derivatives, polythiophene derivatives, polyaniline derivatives, polytoluidine derivatives, CuI, CUSCN, $CuInSe_2$, Cu(In,Ga)Se, $CuGaSe_2$, $Cu_2O$, CuS, $CuGaS_2$, $CuInS_2$, $CuAlSe_2$, GaP, NiO, CoO, FeO, $Bi_2O_3$, $MoO_2$, and $Cr_2O_3$.

(Substrates)

Preferably employed as substrates usable in the present invention may be plastic films composed, for example, of polyolefins such as polyethylene or polypropylene, polycarbonates, cellulose acetate, polyethylene terephthalate, polyethylene dinaphthalene dicarboxylate, polystyrene naphthalates, polyvinyl chloride, polyimide, polyvinyl acetals, and polystyrene. In addition, preferred are syndioctatic structured polystyrenes. These are prepared employing the methods described, for example, in each of JP-A Nos. 62-117708, 1-46912, and 1-178505. Further listed examples include metal substrates including stainless steel, paper supports such as baryta paper or resin coated paper, supports including the above plastic film having thereon a reflection layer, and those which are described in JP-A No. 62-253195 (pages 29–31) as a support. Further preferably employed are those described on page 28 of RD No. 17643, from the right column to the left column on page 648 of RD No. 18716, and on page 879 of RD No. 307105. As described in U.S. Pat.

No. 4,142,735, these supports may be subjected to a thermal treatment at a temperature lower than Tg so that core-set curl is decreased. Further, the surface of these supports may be subjected to a surface treatment with the aim of enhancement of adhesion of the support to other constituting layers. In the present invention, employed as surface treatments may be a glow discharge treatment, an ultraviolet radiation irradiation treatment, a corona treatment and a flame treatment. Further employed may be supports described on pages 44–149 of Kochi Gijutsu (Prior Art Technology) No. 5 (published by AZTEC Corp., dated Mar. 22, 1991). Further listed are those described on page 1009 of RD No. 308119, as well as in the item "Supports" on page 108 of Product Licensing Index Volume 92. Other than the above, employed may be glass substrates as well as epoxy resins kneaded with glass powder.

(Electrodes)

In the display element of the present invention, it is preferable that at least one of the counter electrodes is a metal electrode. Employed as metal electrodes may be metals such as platinum, gold, silver, copper, aluminum, zinc, nickel, titanium, or bismuth, as well as alloys thereof, which are known in the art. Preferred metals employed in the metal electrodes are those which exhibit a work function near the oxidation-reduction potential of silver in electrolytes. Of these, a silver electrode or an electrode composed of silver in an amount of at least 80 percent is advantageous to maintain a reduced state of silver, and in addition, results in anti-staining of electrodes. Employed as methods for preparing electrodes may be conventional ones such as a evaporating method, a printing method, an ink-jet method, a spin coating method, or a CVD method.

Further, it is preferable that in the display element of the present invention, at least one of the counter electrodes is a transparent type of electrode. Transparent electrodes are not particularly limited as long as they are transparent and electrically conductive. Examples include indium tin oxide (ITO), indium zinc oxide (IZO), tin oxide, fluorine-containing tin oxide (FTO), indium oxide, zinc oxide, platinum, gold, silver rhodium, copper, chromium, carbon, aluminum, silicon, amorphous silicon, and BSO (bismuth silicon oxide). In order to form electrodes as described above, for example, an ITO layer may be subjected to mask evaporation on a substrate employing a sputtering method, or after forming an ITO layer on the entire surface, patterning may be performed employing a photolithographic method. The surface resistance value is preferably 100 Ω/sq or less, but is more preferably 100 Ω/sq or less. The thickness of the transparent electrodes is not particularly limited but is commonly 0.1–20 μm.

(Other Components Constituting the Display Element)

If desired, employed in the display element of the present invention may be sealing agents, column-structured materials, and spacer particles.

Sealing agents are those to seal materials so that they do not leak out. Employed as sealing agents may be heat curing, light curing, moisture curing, and anaerobic curing type resins such as epoxy resins, urethane resins, acryl resins, vinyl acetate resins, enethiol resins, silicone resins, or modified polymer resins.

Column-structured materials provides strong self-supporting (strength) between substrates. For example, listed may be a cylindrical form, a quadrangular form, an elliptic cylindrical form, and a trapezoidal form which are arranged at definite intervals in a specified pattern such as a lattice. Further, employed may be stripe-shaped ones arranged at definite intervals. It is preferable that the column-structured materials are not randomly arranged but arranged at an equal distance, arranged so that the interval gradually varies, or a predetermined pattern is repeated at a definite cycle so that the distance between substrates is appropriately maintained and image display is not hindered. When the column-structured materials are such that the ratio of the area occupied by the display region of a display element is 1–40 percent, sufficient strength for commercial viability is obtained as a display element.

In order to maintain a uniform gap between paired substrates, provided may be spacers between them. As such spacers, exemplified may be spheres composed of resins or inorganic oxides. Further, suitably employed are adhesion spacers the surface of which is coated with thermoplastic resins. In order to maintain the uniform gap between substrates, provided may only be column-structured materials. However, both spacers and column-structure materials may be provided. In place of the column-structured materials, only spacers may be employed as a space-maintaining member. The diameter of spacers, when a column-structured material is formed, is at most its height, but is preferably equal to the height. When the column-structured material is not formed, the diameter of spacers corresponds to the distance of the cell gap.

(Screen Printing)

In the present invention, it is possible to form sealing agents, column-structured materials, and electrode patterns, employing a screen printing method. In screen printing methods, a screen on which predetermined patterns are formed is covered on the electrode surface, and printing materials (compositions to form column-structured materials such as light-curing resins) are placed on the screen. Subsequently a squeegee is moved at predetermined pressure, angle and rate. By such action, the printing materials are transferred onto the above substrate via the pattern of the screen. Then, the transferred materials are thermally cured and dried. When column-structured materials are formed employing the screen printing method, resinous materials are not limited to light-curing resins, but also employed, for example, may be heat curable resins such as epoxy resins or acryl resins, as well as thermoplastic resins. Listed as thermoplastic resins are polyvinyl chloride resins, polyvinylidene chloride resins, polyvinyl acetate resins, polymethacrylic acid ester resins, polyacrylic acid ester resins, polystyrene resins, polyamide resins, polyethylene resins, polypropylene resins, fluorocarbon resins, polyurethane resins, polyacrylonitrile resins, polyvinyl ether resins, polyvinylketone resins, polyether resins, polyvinylpyrrolidone resins, saturated polyester resins, polycarbonate resins, and chlorinated polyether resins. It is preferable that resinous materials are employed in the form of a paste while dissolved in suitable solvents.

As noted above, after forming the column-structured materials on the substrate, spacers are provided on at least one side of the substrate, and paired substrates are placed so that the electrode forming surfaces face each other, whereby a vacant cell is formed. By heating the paired facing substrates, they are allowed to adhere to each other under application of pressure from both sides, whereby a display cell is obtained. Preparation of a display element may be performed by injecting an electrolyte composition between the substrates, employing a vacuum injection method. Alternatively, during adhesion of substrates, an electrolyte composition may be dripped on the surface of one of the substrates and then simultaneously sealed when the substrates are allowed to adhere to each other.

(Method for Driving Display Element)

In the display element of the present invention, it is preferable that the driving operation of the counter electrodes described above is simple matrix drive.

In the display element of the present invention, a plurality of positive electrode lines and a plurality of negative electrode lines are placed face to face so that the positive electrode lines and the negative electrode lines cross in right angles. "Simple matrix drive", as described in the present invention, refers to the driving method in which electric current is sequentially applied to these positive electrode lines and negative electrode lines. By employing the simple matrix driving, it is possible to simplify the circuit structure and the driving IC, resulting in advantages such as lower production cost.

The display element of the present invention may be subjected to active matrix drive. Active matrix drive refers to a system in which scanning lines, data lines, and current feeding lines are formed in a checkered pattern and driving is performed by TFT circuits arranged in each of the squares of the checkered pattern. Since switching is performed for each pixel, advantages result in gradation as well as memory function.

(Fields in which the Display Element of the Present Invention is Applied)

It is possible to apply the display element of the present invention to ID card related fields, public information related fields, transportation related fields, broadcasting related fields, account settling fields, and distribution and logistics related fields. Specific examples include door keys, student identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, residents' basic registers and passports.

EXAMPLES

The present invention will now be described with reference to examples, but is not limited thereto.

<<Preparation of Display Elements>>

[Preparation of Display Element 1]

(Preparation of Electrolyte Solution 1)

Added to 2.5 g of dimethyl sulfoxide were 90 mg of sodium iodide and 75 mg of silver iodide, which were completely dissolved. Thereafter, 0.5 g of titanium oxide was added and subsequently dispersed, employing an ultrasonic homogenizer. Added to the resulting dispersion was 150 mg of polyvinyl alcohol (PVA245, produced by. Kuraray Co., Ltd.) and the resulting mixture was stirred for one hour while heated at 120° C., whereby Electrolyte Solution 1 was obtained.

(Preparation of Transparent Electrode)

Lines of an ITO film at a pitch of 150 μm was formed on a 1.5 mm thick 2 cm×4 cm glass substrate according to the method known in the prior art method, whereby a transparent electrode (Electrode 1) was obtained.

(Preparation of Metal Electrode)

Silver paste ink (produced by TOYOBO Co., Ltd.) was screen printed at a pitch of 150 μm on a 1.5 mm thick 2 cm×4 cm glass substrate and heated for 30 minutes in a vacuum oven at 150° C., whereby a silver electrode (Electrode 2) was obtained.

(Preparation of Display Element)

4% by volume of polyacrylic spherical beads of an average diameter of 20 μm were mixed with Electrolyte Solution 1 followed by agitating. The mixture was applied onto Electrode 2, and subsequently, Electrode 1 was placed on Electrode 2, followed by pressing at a pressure of 9.8 kPa, whereby Display Element 1 was prepared.

(Preparation of Display Elements 2–21)

Display Elements 2–21 were prepared in the same manner as above Display Element 1, except that Electrolyte Solution 1 was replaced with Electrolyte Solutions 2–21 in which combinations of the types and added amount of silver salts, the types and added amount of various additives, as well as the types of solvents were varied as listed in Table 1.

Each of the additives listed in Table 1, using abbreviation, is detailed below.

<Silver Salt>
TsAg: silver para-toluenesulfonate
Silver Salt 1: silver salt of 2-dimethylamino-ethyl-1-mercaptane
Silver Salt 2: silver salt of 2-mercaptobenzimidazole <Additives>
*1: 2-mercaptobenzimidazole
*2: 2-dimethylamino-1-mercaptoethane: $(CH_3)_2N\,(CH_2)_2$—SH <Solvents>
DMSO: dimethylsulfoxide
DMF: dimethylformamide
DMAc: dimethylacetoamide
PC: propylene carbonate <<Evaluation of Display Elements>>

(Driving Method)

Silver in an electrolyte underwent dissolution-deposition reactions at an electric amount of 5 $mC/cm^2$, employing passive matrix driving circuit known in the prior art, whereby a white display (a silver dissolution state) and a black display (a silver deposition state) were switched.

(Evaluation of Memory Function)

Memory function of each display elements was evaluated in the following procedure.

By controlling the electricity passed through the display element, blackening of the display element was stopped when the reflectance was changed to 10% (Reflectance 1), while monitoring the reflectance using a spectrophotometer, then, the display element was left for 12 hours while no electric power was supplied. The reflectance of the display element after leaving for 12 hours was measured again (Reflectance 2), and the changing ratio of reflectance was determined:

(Changing Ratio of Reflectance)=(Reflectance After left for 12 hours; Reflectance 2)/(Reflectance Just After Stopped Blackening; Reflectance 1). The results were shown in Table 1. The closer to 1 the changing ratio of reflectance is, the more stable the blackened image is, and the more superior memory function the display element shows.

TABLE 1

| | Electrode Configuration | | Electrolyte Solution No. | Electrolyte solution Composition | | | | | | | | |
|---|---|---|---|---|---|---|---|---|---|---|---|---|
| | | | | Silver Salt | | Additive 1 | | Additive 2 | | | | |
| Display Element No. | Electrode 1 | Electrode 2 | | Compound | Concentration (*A) | Compound | Concentration (*A) | Compound | Concentration (*A) | Solvent | Changing Ratio of Reflectance | Remarks |
| 1 | ITO | Ag | 1 | AgI | 0.10 | NaI | 0.20 | — | — | DMSO | 7.90 | Comp. |
| 2 | ITO | Ag | 2 | AGI | 0.10 | NaI | 0.20 | *1 | 0.10 | DMSO | 7.10 | Comp. |
| 3 | ITO | Ag | 3 | AgI | 0.10 | NaI | 0.20 | 1-2 | 0.10 | DMSO | 3.77 | Inv. |
| 4 | ITO | Ag | 4 | AgI | 0.10 | NaI | 0.20 | 1-4 | 0.10 | DMF | 3.69 | Inv. |
| 5 | ITO | Ag | 5 | AgI | 0.10 | NaI | 0.20 | 1-10 | 0.10 | DMF | 5.23 | Inv. |
| 6 | ITO | Ag | 6 | AgI | 0.10 | NaI | 0.20 | 2-12 | 0.10 | PC | 4.01 | Inv. |
| 7 | ITO | Ag | 7 | AgI | 0.10 | NaI | 0.20 | 3-8 | 0.10 | DMF | 4.89 | Inv. |
| 8 | ITO | Ag | 8 | AgI | 0.10 | NaI | 0.20 | 4-1 | 0.10 | DMSO | 4.67 | Inv. |
| 9 | ITO | Ag | 9 | AgI | 0.10 | NaI | 0.20 | 5-4 | 0.10 | DMSO | 4.31 | Inv. |
| 10 | ITO | Ag | 10 | AgBr | 0.10 | NaI | 0.20 | 6-4 | 0.10 | DMSO | 4.54 | Inv. |
| 11 | ITO | Ag | 11 | AgCl | 0.10 | NaI | 0.20 | 7-1 | 0.10 | DMSO | 4.65 | Inv. |
| 12 | ITO | Ag | 12 | AgI | 0.15 | — | — | *2 | 0.30 | DMSO | 4.77 | Inv. |
| 13 | ITO | Ag | 13 | AgBr | 0.15 | — | — | *2 | 0.45 | DMF | 3.87 | Inv. |
| 14 | ITO | Ag | 14 | TsAg | 0.15 | — | — | 1-10 | 0.40 | DMSO | 3.45 | Inv. |
| 15 | ITO | Ag | 15 | TsAg | 0.15 | NaI | 0.075 | — | — | DMSO | 4.44 | Inv. |
| 16 | ITO | Ag | 16 | TsAg | 0.15 | NaBr | 0.045 | — | — | DMSO | 3.76 | Inv. |
| 17 | ITO | Ag | 17 | Silver Salt 1 | 0.15 | — | — | — | — | DMF | 4.39 | Inv. |
| 18 | ITO | Ag | 18 | Silver Salt 2 | 0.15 | — | — | — | — | DMAc | 3.28 | Inv. |
| 19 | ITO | Ag | 19 | TsAg | 0.15 | LiBr | 0.03 | 1-10 | 0.40 | PC | 2.31 | Inv. |
| 20 | ITO | Ag | 20 | Silver Salt 2 | 0.15 | LiCl | 0.03 | 1-10 | 0.40 | DMSO | 1.98 | Inv. |
| 21 | ITO | Ag | 21 | TsAg/ Silver Salt 2 | 0.15/ 0.15 | LiCl | 0.03 | 1-2 | 0.40 | PC | 1.76 | Inv. |

*A: mol/kg
Inv.: Inventive Sample,
Comp.: Comparative Sample

As shown in Table 1, the display elements having the constitution specified in the present invention exhibited more stable memory functions of the silver image compared to those of the comparative samples.

What is claimed is:

1. A display element comprising a pair of electrodes having therebetween an electrolyte layer containing silver or a silver-containing compound, the display element being driven by the pair of electrodes so as to electrochemically dissolve silver or to electrochemically deposit silver, wherein the electrolyte layer contains a compound represented by one of Formulae (1) to (7) or a compound derived from the compound represented by one of Formulae (1) to (7):

Formula (1)

wherein:

$R_1$ through $R_3$ each represents a hydrogen atom or a substituent.

Formula (2)

wherein:

M represents a hydrogen atom, a metal atom or a quarternary ammonium;

Z represents a group of atoms necessary to form a nitrogen containing heterocyle combined with a carbon atom and a nitrogen atom, provided that Z is not an imidazole ring;

n represents an integer of 0 to 5;

$R_4$ represents a hydrogen atom or a substituent; and when n is an integer of two or more, each $R_4$ may be the same or different, and each $R_4$ may be combined to form a condensed ring, Formula (3)

wherein:

Q represents a group of atoms necessary to form a 5- or 6-membered nitrogen-containing heterocycle combined with a nitrogen atom;

m represents an integer of 0 to 5;

$R_5$ represents a hydrogen atom or a substituent; and when m is an integer of two or more, each $R_5$ may be the same or different, and $R_5$ may be combined to form a condensed ring, $$H_2N-R_6 \quad \text{Formula (4)}$$

wherein: $R_6$ represents an alkyl group, an aryl group or a heterocyclic group, $$R_7-S-S-R_8 \quad \text{Formula (5)}$$

wherein:

$R_7$ and $R_8$ each represents an alkyl group, an aryl group or a heterocyclic group;

$R_7$ and $R_8$ may be the same or different; and $R_7$ and $R_8$ may be combined to form a ring,

$$R_9-S-R_{10} \quad \text{Formula (6)}$$

wherein:

$R_9$ and $R_{10}$ each represents an alkyl group, an aryl group or a heterocyclic group;

$R_9$ and $R_{10}$ may be the same or different; and $R_9$ and $R_{10}$ may be combined to form a condensed ring, Formula (7)

wherein:

$R_{11}$ and $R_{12}$ each represents an alkyl group or a hydrogen atom, provided that $R_{11}$ and $R_{12}$ are not simultaneously a hydrogen atom; and $R_{11}$ and $R_{12}$ may be combined to form a ring.

2. The display element of claim 1, wherein the electrolyte layer further contains a solvent selected from the group consisting of: propylene carbonate, ethylene carbonate, ethylmethyl carbonate, diethyl carbonate, dimethyl carbonate, butylene carbonate, γ-butyrolactone, tetramethylurea, sulfolane, dimethyl sulfoxide, 1,3dimethyl-2imidazolidinone, 2-(N-methyl)-2-pyrrolidinone, hexamethylphosphortriamide, N-methylpropione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, an acetic anhydride, ethylacetate, ethyl propionate, dimethoxy ethane, diethoxyfuran, tetrahydrofuran, ethylene glycol, diethylene glycol, triethylene glycol monobutyl ether, and water.

3. The display element of claim 1, wherein the electrolyte layer further contains white particles.

4. The display element of claim 1, wherein the electrolyte layer further contains a thickener selected from the group consisting of a polyvinyl alcohol, a hydroxypropyl cellulose, a polyalkylene glycol and a polyvinyl pirrolidone.

5. The display element of claim 1, wherein one of the pair of electrodes is a metal electrode.

6. The display element of claim 1, wherein one of the pair of electrodes is a transparent electrode.

7. The display element of claim 1, wherein a display element operation is simple matrix drive.

8. A display element comprising a pair of electrodes having therebetween an electrolyte layer containing:

(i) silver or a silver-containing compound; and (ii) halogen ions or a halide compound, the display element being driven by the pair of electrodes so as to electrochemically dissolve silver or to electrochemically deposit silver, wherein the electrolyte layer satisfies Formula (9):

$$0 < [X]/[Ag] \leq 0.8 \quad \text{Formula (9)}$$

wherein:

[X] represents a total number of moles of halogen atoms contained in the halogen ions or the halide compound in the electrolyte layer; and

[Ag] represents a total number of moles of silver atoms contained in the electrolyte layer.

9. The display element of claim 8, wherein the electrolyte layer further contains a solvent selected from the group consisting of:

propylene carbonate, ethylene carbonate, ethylmethyl carbonate, diethyl carbonate, dimethyl carbonate, butylene carbonate, γ-butyrolactone, tetramethylurea, sulfolane, dimethyl sulfoxide, 1,3-dimethyl-2-imidazolidinone, 2-(N-methyl)-2-pyrrolidinone, hexamethylphosphortriamide, N-methyl propione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, an acetic anhydride, an ethylacetate, ethyl propionate, dimethoxy ethane, diethoxyfuran, tetrahydrofuran, ethylene glycol, diethylene glycol, triethylene glycol monobutyl ether, and water.

10. The display element of claim 8, wherein the electrolyte layer further contains white particles.

11. The display element of claim 8, wherein the electrolyte layer further contains a thickener selected from the group consisting of a polyvinyl alcohol, a hydroxypropyl cellulose, a polyalkylene glycol and a polyvinyl pirrolidone.

12. The display element of claim 8, wherein one of the pair of electrodes is a metal electrode.

13. The display element of claim 8, wherein one of the pair of electrodes is a transparent electrode.

14. The display element of claim 8, wherein a display element operation is simple matrix drive.

* * * * *